United States Patent [19]

Walker et al.

[11] 4,006,280
[45] Feb. 1, 1977

[54] BATTERY HEAT SHIELD AND WINDSHIELD WASHER RESERVOIR

[75] Inventors: Paul La Verne Walker, Royal Oak; Carmon Rue Strobel, Washington, both of Mich.

[73] Assignee: Chrysler Corporation, Highland Park, Mich.

[22] Filed: July 11, 1975

[21] Appl. No.: 594,995

[52] U.S. Cl. .................. 429/98; 220/20; 220/22; 206/524.5; 429/120
[51] Int. Cl.² .................. H01M 2/02; B65D 1/24
[58] Field of Search .................. 220/20, 22, 23.8; 206/2; 136/166; 429/120, 98

[56] References Cited
UNITED STATES PATENTS

| 1,609,403 | 12/1926 | Danek | 220/22 |
| 3,388,007 | 6/1968 | Fiandt | 206/2 X |
| 3,764,394 | 10/1973 | Phillips | 136/166 |

Primary Examiner—William Price
Assistant Examiner—Steven M. Pollard
Attorney, Agent, or Firm—Talburtt & Baldwin

[57] ABSTRACT

A single unit is provided which serves the dual functions of windshield washer reservoir and storage battery heat shield. The unit is a thin walled box-like structure sized to overlie a battery. A portion or all of the sides of the unit are formed to provide a cavity for holding windshield washer fluid. This cavity, with or without the presence of fluid, provides extremely effective thermal insulation for the prevention of battery overheating.

7 Claims, 3 Drawing Figures

U.S. Patent    Feb. 1, 1977    4,006,280
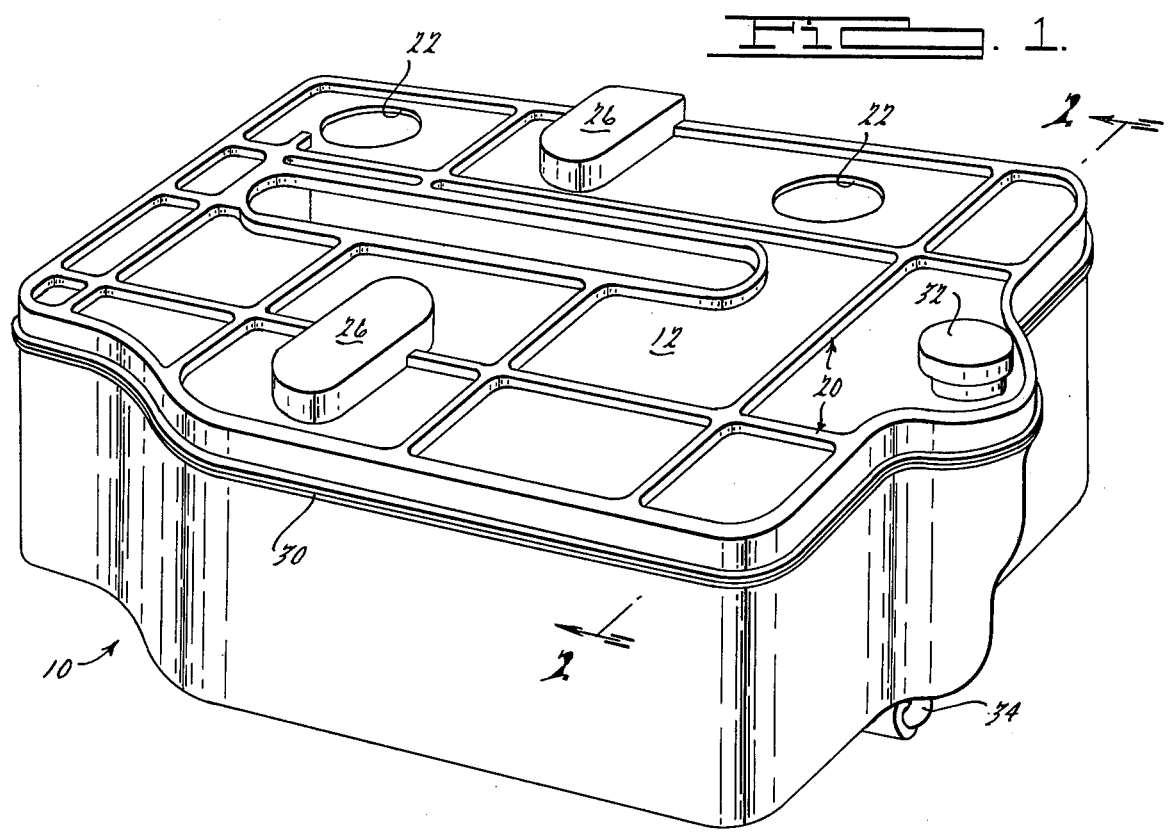
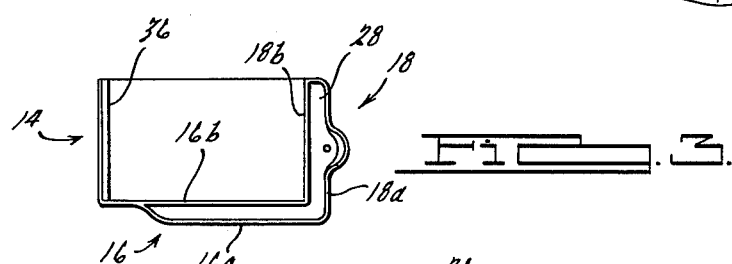
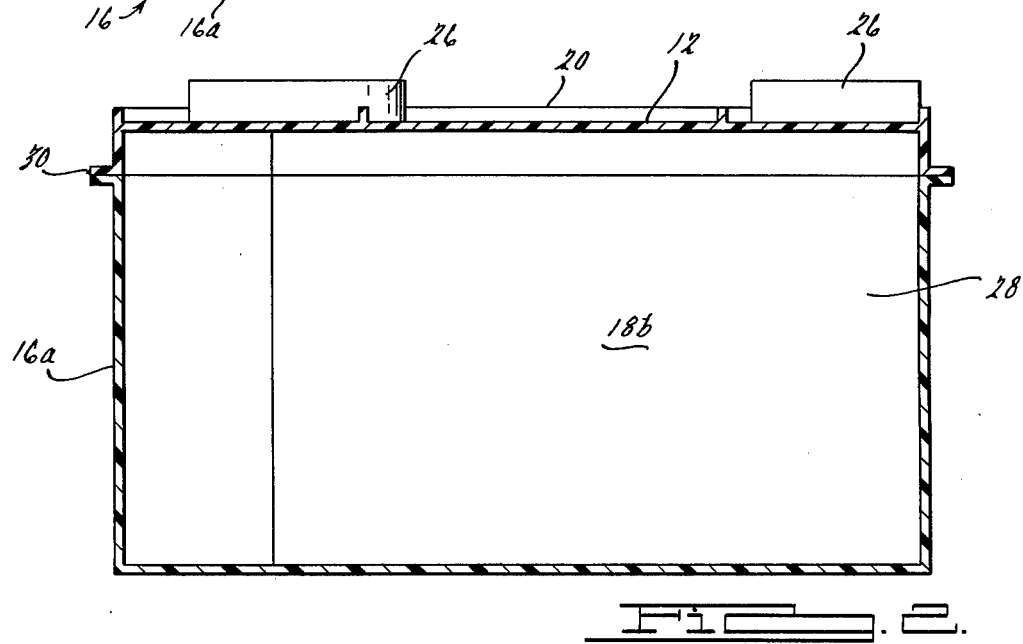

BATTERY HEAT SHIELD AND WINDSHIELD WASHER RESERVOIR

BACKGROUND OF THE INVENTION

Vehicle windshield washer systems have long been employed and are now generally considered as safety equipment needed by every vehicle. Such washer systems require the use of a substantial quantity of washer fluid which necessitates fairly large size reservoir apparatus.

A more recent phenomia is the substantial increase in vehicle underhood temperatures generally associated with exhaust emission control apparatus such as the air pump and catalytic converter. The higher temperatures in turn have had a decided detrimental effect on storage battery life, as generally the vehicle battery is located in the engine compartment immediately adjacent the engine where it is directly exposed to the engine manifold. In the desire to provide longer battery life and improve customer satisfaction, a heat shield is sometimes utilized which is placed around the battery to help prevent excessive battery temperature build-up. The battery shield itself, however, is a relatively large device and it, along with the windshield washer reservoir, take up a substantial amount of underhood space, a location where space is at a premium.

SUMMARY OF THE INVENTION

The principal object of the present invention, in view of the foregoing, is to provide a new structure which will serve as a windshield washer reservoir while offering superior performance as a battery heat shield, and at the same time occupy less space than the reservoirs and heat shield currently employed.

Studies have now shown that the internal temperature of a battery and charge voltage impressed on the battery have a great effect on charge current and gas evolution. Test results reveal that as the charge voltage and temperature increase linearly, the charge current and gas evolution increase exponentially.

Batteries subjected to prolonged elevated temperature show a thermal effect on the plates which lead to shortened battery life. Thus, batteries operated at 165° F. had only about 70 percent of the life of batteries operated at 100° F. Moreover, corrosion of the positive grid was more pronounced in the batteries tested at 150° F. Batteries tested at 180° F. exhibited deterioration of the negative plate in addition to grid corrosion and had approximately 50 percent of the life of batteries operated at 150° F., or a potential loss of 70% as compared to batteries operated at 100° F.

The findings taken from such tests are that battery internal, that is electrolyte temperature should preferably not exceed about 150° F. except for brief periods in order to achieve optimum battery life. Such will reduce the chance for uncontrolled operation and keep maintenance, water addition, and corrosion to a minimum. For example, high electrolyte temperature affects the chemical oxidation rate of the battery, with the rate of oxidation doubling for every 18° F. above 80° F. Likewise, evaporation of water from the sulfuric acid electrolyte solution tends to greatly accelerate the oxidation of internal components of the battery.

The unit of this invention combines the functions of battery heat shield and windshield washer reservoir in a single structure which offers superior battery heat protection and a substantial saving in underhood space.

The device of this invention is a box-like structure which can be placed over the battery to be protected. Its side walls are preferably slightly spaced from the battery surface and a fluid reservoir chamber is provided in one or more of the structure walls.

DESCRIPTION OF THE DRAWINGS

FIG. 1 is an overall perspective view of the combination battery heat shield-windshield washer reservoir of this invention;

FIG. 2 is a section view taken along the line 2—2 of FIG. 1; and

FIG. 3 is a reduced scale plan view.

DETAILED DESCRIPTION

The battery heat shield and windshield washer fluid reservoir structure 10 of this invention is seen with reference to FIG. 1 to comprise a rectangular box-like structure having an optional top cover portion 12 and three side members 14, 16 and 18. In a preferred form for use in the engine compartment of a vehicle, bottom and rear wall members are not necessary as the corresponding battery surfaces are either shielded by other portions of the vehicle or not directly exposed to the engine. The top cover 12 is provided with stiffening ribs 20 as well as openings 22 for the battery terminals, an opening 24 for the battery fill caps and recesses 26 for housing battery tie-down or securing means.

In the illustrated embodiment, a windshield washer fluid reservoir or chamber 28 is formed in two sides by inner and outer walls 16a, 16b, 18a and 18b. It will be understood that the reservoir can be formed on a single side or extend completely around the structure. It has been found that the reservoir provides excellent heat protection for the battery by means of the fluid therein when full or the air space when empty. A reservoir fluid capacity of at least 50 ounces and preferably in excess of eighty ounces has been found most satisfactory for good washer performance.

The heat shield-fluid reservoir of this invention has been facilitated with excellent results from talc filled polypropylene as it gives rise to a structure which is lightweight, mar resistant, has good high temperature stability and low temperature strength. A wall thickness of about 0.1 inch has been found adequate. The cover can be fabricated separately and simply snap-fitted or welded as at 30 to the body of the structure. A fill port 32 in the cover and an outlet 34 in the bottom of the reservoir are provided for fluid addition and withdrawal.

In use, the heat shield-fluid reservoir is simply slipped over the battery to be protected and is held in place by the battery cable terminals which overlies the cover. As indicated above, it has been found that the fluid in the reservoir provides a very effective heat shield and maintains the battery electrolyte about 30° cooler than an unprotected battery electrolyte. If desired, additional heat shielding can be provided by forming a layer of insulation such as rigid, cellular urethane foam 36 on those surfaces where there is no reservoir as for example side member 14 (FIG. 3).

We claim:

1. A combination storage battery heat shield and windshield washer reservoir device comprising a box-like structure having a generally planar cover for overlying the top of said battery, said cover being provided with openings to facilitate battery servicing, and a plurality of interconnected wall members extending generally at right angles to said cover for overlying the sides of said battery, and at least one of said wall members forming at least a portion of a chamber for storing a windshield washing fluid.

2. The battery heat shield and windshield washer reservoir device of claim 1 wherein said chamber wraps around a corner of said box-like structure with two of said wall members forming at least a portion of said windshield washing fluid chamber.

3. The battery heat shield and windshield washer reservoir device of claim 2 wherein said chamber has a minimum capacity of about fifty fluid ounces.

4. The battery heat shield and windshield washer reservoir device of claim 2 wherein said chamber is provided with a fluid fill port in said top cover and a fluid withdrawal port adjacent the bottom of said chamber.

5. The battery heat shield and windshield washer reservoir device of claim 1 wherein said side walls and cover are fabricated of polypropylene and wherein an insulating layer of urethane foam is provided on at least one of said wall members.

6. A combination storage battery heat shield and windshield washer reservoir device comprising a plurality of side wall members interconnected generally at right angles to each other to form a shield to at least partially overlie the sides of a battery, and at least one of said wall members forming at least a portion of a chamber for storing a windshield washer fluid.

7. In a vehicle having a storage battery disposed in proximity to a source of heat potentially damaging to the battery, the improvement comprising in combination with said battery; means defining a combination storage battery heat shield and windshield washer reservoir; said means comprising interconnected wall members to at least partially enclose said battery in heat shielding relationship to said source, and a fluid reservoir integral with said heat shield, said reservoir having a common wall with said heat shield.

* * * * *